Aug. 22, 1961   F. W. SEYBOLD   2,997,149
OVERLOAD RELEASE COUPLING
Filed April 18, 1960   2 Sheets-Sheet 1

INVENTOR.
Frederick W. Seybold

Aug. 22, 1961           F. W. SEYBOLD           2,997,149

OVERLOAD RELEASE COUPLING

Filed April 18, 1960           2 Sheets-Sheet 2

INVENTOR.

Frederick W. Seybold

United States Patent Office 2,997,149
Patented Aug. 22, 1961

2,997,149
OVERLOAD RELEASE COUPLING
Frederick W. Seybold, 1979 Dogwood Drive,
Scotch Plains, N.J.
Filed Apr. 18, 1960, Ser. No. 22,897
9 Claims. (Cl. 192—56)

This invention pertains to an overload release coupling which is interposed between the driving member and the driven member of a machine to prevent serious damage thereto in case an abnormal obstruction or other overload occurs. Suitable applications for overload devices of this nature are punch presses, printing presses, conveyors, brakes, shears, machine tools and many others.

This coupling being of the uni-directional type is of particular advantage in such applications where the machine has to be reversed in order to remove a possible obstruction from the machine. A bi-directional coupling after re-engaging, would again become disengaged during reverse rotation by the same overload which caused its disengagement in the normal direction of rotation. A uni-directional coupling according to this invention will not become disengaged when the rotation of the driving member is opposite to that of its normal direction of rotation.

The object of the present invention is to provide an overload device which disconnects the input member from the output member when a predetermined torque value is exceeded and which maintains said disconnected condition thereafter.

A further object of this invention is to provide an overload device which will disconnect the input member from the output member in its normal driving direction only when a predetermined torque value is exceeded, but said overload device will remain connected when said input member is made to turn in the reverse direction from that of normal.

A still further object of this invention is to provide an overload device with means whereby the release torque may be varied considerably.

A further object of this invention is to provide an overload device which may be readily reconnected without special tools.

A still further object of this invention is to provide an overload device in which its components may be inverted to make the device disengageable in either direction of rotation, while retaining the feature of the device so that it remains locked in one or the other direction of rotation.

Furthermore, it is the object of this invention to provide an overload device in which the means that control the disengaging torque also perform the function of keeping the connecting means disengaged.

This invention includes other novel features of construction which make this overload device eminently practical and superior in operation. Minor changes and rearrangements will, of course, be obvious to those skilled in the art, and such minor changes that can be made in the embodiment of the invention are to be understood to come within the scope of the claims.

The objects stated above with their advantages will become apparent upon reference to the following description taken in connection with the accompanying drawings, of which:

*General arrangement*

Figure 1:
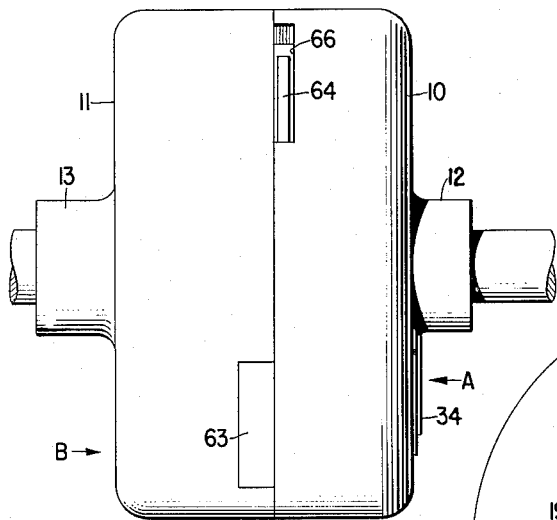
FIGURE 1 is a general elevation view of the external appearance of the overload device composed of an input member and an output member.

In general this invention comprises an input member and an output member, each being of cup-shaped form and provided with a hub for receiving a suitable bore for a shaft. One of these cup-shaped members is provided with suitable bosses to which a pair of spaced, circular plates are bolted. A relatively large bore is provided in these plates for seating the circular portion of the torque adjusting wedge. Two smaller bores in these plates receive ball bearings to journal a multiple spring rest and a reset shaft.

Two spaced arms are integral with the reset shaft and near their extremity a hinge pin is provided on which two links and a centrally located roller are mounted. The other extremity of said links is also provided with a hinge pin on which three spring guide rod yokes are supported as well as two rollers which align in the large bore of the two plates and bear against one incline of the torque adjusting wedge.

Suitable springs under load are mounted over the spring guide rods between said yokes and said multiple spring rest, thereby positioning the centrally located roller in a disengaging block or cam which is fastened to the other cup-shaped member.

A variation in torque rating of the device may be attained in three ways:

(1) By the number of springs assembled in the device,
(2) By changing the spring rate or size of the spring wire dia.
(3) By adjusting the wedge by means of a small worm meshing with suitable teeth cut into the periphery of the wedge.

The centrally located roller will remain seated in the disengaging block as long as the driven torque does not exceed the rated torque to which the input member has been adjusted. However, if due to a sudden jamb or other overload of the driven member the centrally located roller will climb out of the depression in the block, forcing the rollers on the links to climb up one of the inclines of the wedge against the pressure of the spring or springs until the point of the wedge is reached and slightly beyond, whereupon the spring pressure will compel the rollers down the other incline of the wedge, thereby lifting the large roller free of the block, insuring complete disengagement of the driving member from the driven member.

It should, of course be understood that either of the two members may be used as the driving member, provided that the components are suitably assembled for the required direction of rotation. From a stand point of safety the reset device should preferably be carried by the driving member so that a re-connection cannot be made unless this member is first brought to rest.

Structural arrangement

The overload device comprises two separate cup-shaped members 10 and 11, each being provided respectively with a hub 12 and 13. Said hubs are bored to receive shafts or other driving connections. The cup-shaped member 10 is provided with bosses 14 to which plates 15 and 16, held apart by suitable spacers 17a and 17b, are bolted by means of screws 18 and 19.

Plates 15 and 16 each has a large bore 20 in which rotatably rests the torque adjusting wedge 21. This wedge comprises two 90 degree inclines 22 and 23, spaced apart to provide operating space for other components of the device, and a circular flange 24 and a short hub 25 provided with a tongue 26. A threaded opening 27, centrally located in flange 24, serves to securely clamp wedge 21 to boss 28 on member 10. A recess bore 29 in member 10 receives the flanged clamp piece 30 which has a counterbore 31 for receiving the head of screw 32 and tongues 33 which mate with tongue 26.

As indicator 34 is secured to clamp piece 30, so that when the torque adjusting wedge 21 is turned its motion is transmitted therefrom by means of the tongue 26 to tongues 33 on clamp piece 30 to said indicator 34. The circular flange 24 is provided with teeth 35 which mesh with a worm 35 journalled in bearing 37 which is secured to plate 15. Worm 36 has an extended end 38 with a suitable square 39 thereon to apply a wrench for turning said worm 36. An opening 40 in the cup-shaped member 10 is provided to pass said wrench therethrough to said square 39.

Plates 15 and 16 have additional bores 41 to receive snap-ring ball bearings 42 and 43 which journal reset shaft 44. Spaced arms 45 and 46 are integral with shaft 44 and they are provided with a pin 47 held in position by snap rings 47a. Centrally located on pin 47 is the large roller 48 and links 49 and 50 are adjacent thereto, being spaced by washers 51.

Still further bores 52 in plates 15 and 16 receive snap-ring ball bearings 53 which support the multiple spring rest 54, provided with bores 55 to permit passage therethrough of spring guide rods 56, to the other end thereof the spring guide yokes 57 are secured.

A pin 58 joins links 49, 50 and yokes 57 and ball bearings or rollers 59 on each end of pin 58 and in line with plates 15 and 16 rest on one side of inclines 22 and 23. Pre-loaded springs 60 are mounted over the spring guide rods 56 between the spring rest 54 and spring yokes 57. The reset shaft 44 is equipped with a hexagon-shaped head 61 and member 10 has an opening 62 of such size that a suitable socket wrench may be placed over head 61 so that reset shaft 44 can be rotated in either direction, i.e. to re-engage roller 48 with the torque transmitting cam 63 which is secured to member 11 (usually the driven member), or to disengage roller 48 from cam 63, thereby disconnecting the driven member from the driving member.

Arm 46 on reset shaft 44 has provision for clamping thereto an arm 64 of such length and shape that it is within the outer periphery of member 10 when the components are in their driving position, but it will protrude beyond said periphery when the components are in their disengaged position, whereby a suitably located limit switch 65 will interrupt the electric circuit of the driving motor or give a warning signal that the overload device has become disconnected.

Figure 3:
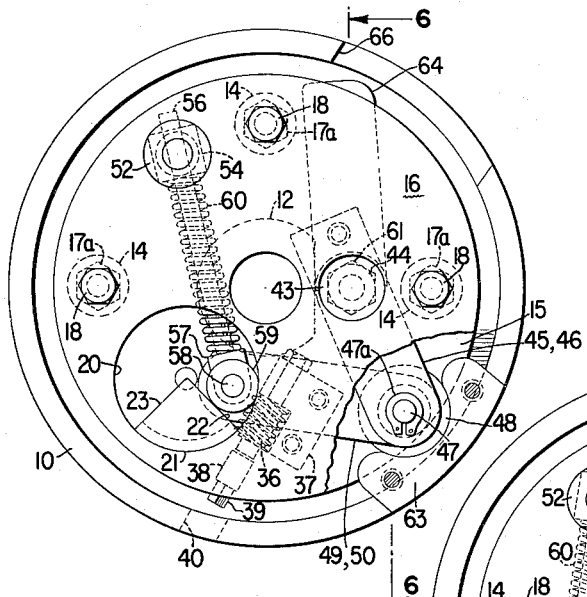
FIGURE 3 is a view of the input member facing in the direction of arrow B of FIGURE 1 and with the output member removed and showing the components of the input member in their engaged or driving position.
Figure 4:
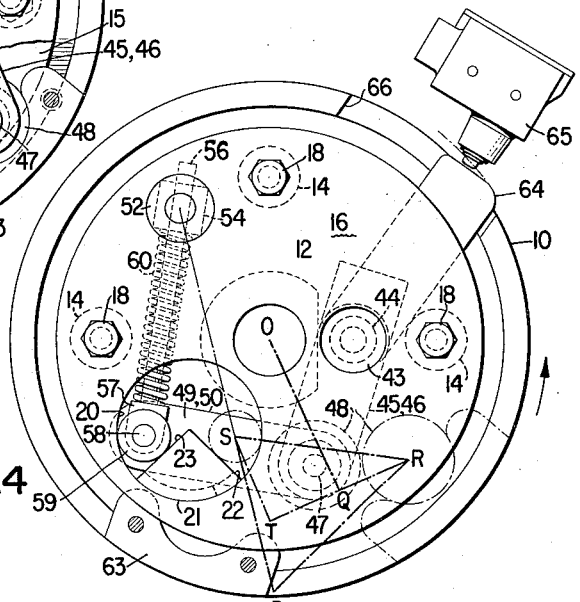
FIGURE 4 is a similar view of the input member as shown in FIGURE 3, but showing its components in their disengaged condition, also a force diagram of its components is shown thereon.
Figure 5:
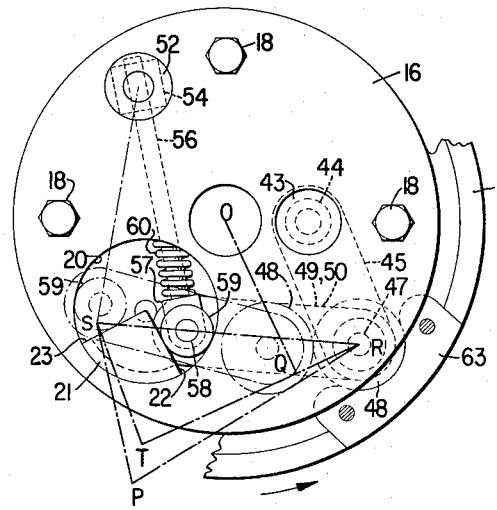
FIGURE 5 is a similar view of the input member as shown in FIGURE 3 showing its component both in the engaged and disengaged position, as well as showing the torque adjusting wedge in a different angular position from that shown in FIGURE 3; the resultant force diagram of its components is also shown thereon.
Figure 9:
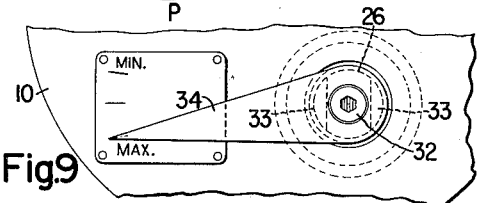
FIGURE 9 is a view of the indicator which records the angular setting of the torque adjusting wedge.
Figure 8:
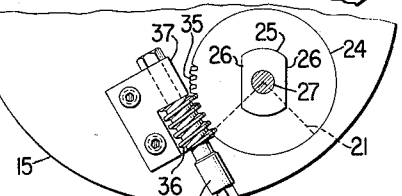
FIGURE 8 is a view looking in the direction A of FIGURE 1, and showing the gearing arrangement for adjusting the relative position of the torque adjusting wedge.

A slot 66 is provided in casing 10 so that arm 64 may protrude as described. FIGURES 3, 4 and 5 show the components assembled in casing 10 for clockwise rotation as viewed from B of FIGURE 1 and driving casing 11 with roller 48 pocketed in cam 63. Should an overload occur then roller 48 will climb out of cam 63 against the resistance of springs 60.

In case that now the direction of rotation is reversed the roller 48 cannot climb out of cam 63 because roller 48 on arms 45—46 then would tend to swing into cam 63 rather than away from it, as it does for counterclockwise rotation. This is a desirable feature in the event that it becomes necessary to back up the machine to which an overload device as described is applied in order to remove the obstacle which caused the overload device to disengage. An overload device which readily disengages in either direction of rotation would not be suitable for such a situation because it would immediately become disengaged again after re-engagement as the cause which produced the disengagement cannot be removed.

Figure 2:
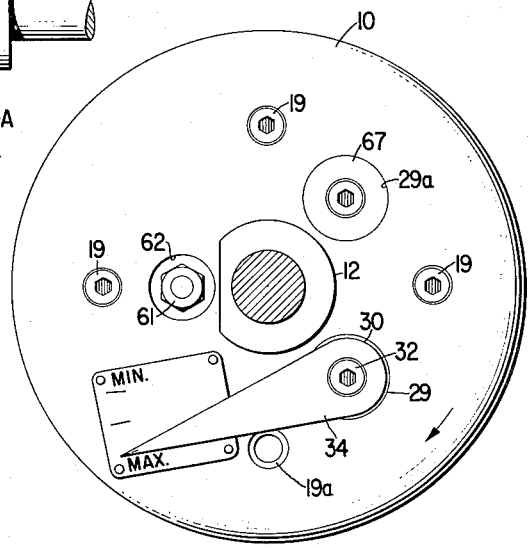
FIGURE 2 is a side view of the device shown in FIGURE 1, facing in the direction of arrow A.
Figure 6:
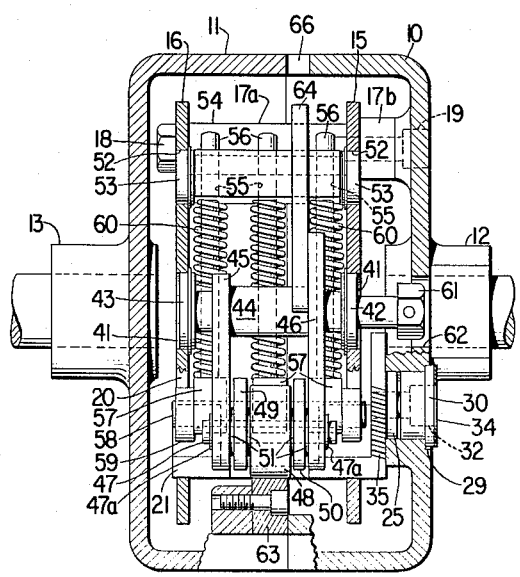
FIGURE 6 is a cross-sectional view of FIGURE 3 taken along lines 6—6 of FIGURE 3 of the overload device.
Figure 7:
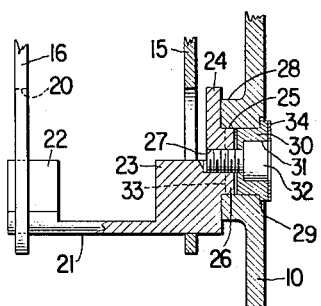
FIGURE 7 is a partial cross-section of the torque adjusting wedge, showing the means for securing it to the input casing.

The casing 10 (see FIGURE 2) is also provided with an additional recess bore 29a, which is symmetrically located relative to recess bore 29, there is also an additional counterbored hole 19a. A counterweight 67 is secured in the recess bore 29a to dynamically balance the components of the overload device.

When the components are to be assembled for clockwise driving, the reset shaft 44 with head 61 will remain in opening 62, but wedge 21 will be fastened in recess bore 29a and the upper screw 19 will be located in counterbore 19a and counterweight 67 will be transferred to recess bore 29.

On FIGURE 4 the diagram of the forces imposed on the various components of the device due to the preload spring pressure is shown. On the diagram SP represents the amount and direction of the spring force, PR is the resultant pressure of rollers 59 on the incline of wedge 21, RS is the compressive stress in links 49—50, ST is the compressive stress in arms 45—46 and RT is the amount and direction of the driving force transmitted through roller 48 to the driving cam 63.

The perpendicular distance OQ to line RT represents the moment arm of the force RT, and the product $RT \times OQ$ is the torque of the overload device. The spring force SP (pounds) being known, the value of RT in terms of the spring scale can readily be determined, as well as the length of OQ (inches) and torque rating $RT \times OQ$ (inch-pounds).

Similarly, in FIGURE 5, the diagram of the forces on the various components is shown, but the torque adjusting wedge 21 is shown in a different position from that shown in FIGURE 4. The incline of wedge 21 is now much steeper relative to rollers 59, whereby with the same spring force SP all the resultant forces have increased and the torque rating has increased about 60%. Still further rotation of wedge 21 will increase the torque rating to approximately 250% of that shown in FIGURE 4.

The design of the overload device illustrated in FIGURES 1 to 9 has now been fully described, it is obvious that various modifications, rearrangements and minor improvements will suggest themselves to those skilled in the art. For example, the wedge 21 with its adjusting mechanism may be eliminated and fixed 90 degrees inclines incorporated in the large openings 20 of the plates 15 and 16 may be substituted.

I claim:
1. An overload release coupling comprising a cup-shaped driving member and a co-axial cup-shaped driven member, a wedge supported by said driving member the tip of said wedge pointing toward the axis of said coupling, an arm rotatably mounted on said driving member, first and second pins, a rotatable block on said driving member, said block having an opening therethrough, a rod having a head thereon, said rod passing through said opening of said block, said head being supported on said first pin, a spring on said rod and biased between said block and said head, a first roller on said first pin and cooperating with said wedge, a link connecting said first and second pins, said second pin being supported on said arm, a second roller on said second pin, a depression in the periphery of said driven member, said second roller when seated in said depression providing a positive driving connection between said driving member and said driven member.

2. An overload release coupling comprising a cup-shaped driving member and a co-axial cup-shaped driven member, an adjustable wedge supported by said driving member, the apex of said wedge pointing radially inwardly, an arm rotatably mounted on said driving member, first and second pins, a rotatable block on said driving member, said block having an opening therethrough, a rod having a head thereon, said rod passing through said opening of said block, said head being supported on said first pin, a spring on said rod and biased between said block and said head, a first roller on said first pin and cooperating with said wedge, a link connecting said first and second pins, said second pin being supported on said arm, a second roller on said second pin, a depression in the periphery of said driven member, said second roller when seated in said depression providing a positive driving connection between said driving member and said driven member.

3. An overload release coupling comprising a driving member and a driven member in co-axial relationship, said driving member having spaced, circular plates secured thereto, a wedge supported by said plates the apex of said wedge pointing radially inwardly, a shaft journalled on said plates and having spaced arms secured thereto, first and second pins, a pivoting block journalled on said plates, said block having one or more openings therethrough, one or more rods having heads thereon and supported on said first pin, one or more springs on said rods and bearing respectively against said heads and said block, a first roller on said first pin and cooperating with said wedge, a pair of links connecting said first and second pins, said second pin being journalled in said arms, a second roller on said second pin, said driven member having a curved cam secured thereto with which said second roller cooperates to provide a positive driving connection between said driving member and said driven member.

4. An overload release coupling comprising a driving member and a co-axial driven member, said driving member having spaced, circular plates secured thereto, an adjustable wedge supported by said plates the apex of said wedge pointing radially inwardly, a shaft journalled on said plates, spaced arms secured to said shaft, first and second pins, a pivoting block journalled on said plates, said block having one or more openings therethrough, one or more rods having heads thereon and supported on said first pin, one or more springs on said rods bearing respectively against said heads and said block, a first roller on said first pin and cooperating with said adjustable wedge, a pair of links connecting said first and second pins, said second pin being journalled in the arms on said shaft, a second roller on said second pin, said driven member having a curved cam secured to its periphery, said second roller cooperating with said cam to provide a positive driving connection between said driving member and said driven member.

5. An overload release coupling comprising a driving member and a co-axial driven member, said driving member having spaced circular plates secured thereto, a rotatable wedge supported by said plates the apex of said wedge pointing radially inwardly, means for rotating said wedge, a shaft journalled on said plates and having spaced arms secured thereto, first and second pins, a pivoting block journalled on said plates, said block having one or more bores therethrough, one or more rods having heads thereon and supported on said first pin, said rods passing through said bores and having springs thereon which bear against said heads and said block, a first roller on said first pin and cooperating with said rotatable wedge, a pair of links connecting said first and second pins, said second pin being journalled in said arms, a second roller on said second pin, said driven member having a curved cam secured to its periphery, said second roller cooperating with said cam to provide a positive driving connection between said driving member and said driven member.

6. An overload release coupling comprising a driving member and a co-axial driven member, said driving member having spaced, circular plates secured thereto, a rotatable wedge supported by said plates the apex of said wedge pointing radially inwardly, means for rotating said wedge, means for clamping said wedge to said driving member, a shaft journalled on said plates, spaced arms secured to said shaft, first and second pins, a pivoting block journalled on said plates, said block having one or more bores therethrough, one or more rods having heads thereon and supported on said first pin, said rods passing through said bores and having springs thereon which bear against said heads and said block, a first roller on said first pin and cooperating with said rotatable wedge, a pair of links connecting said first and second pins, said second pin being journalled in said arms, a second roller on said second pin, said driven member having a curved cam secured to its periphery, said second roller cooperating with said cam to provide a positive driving connection between said driving member and said driven member.

7. An overload release coupling comprising a driving member and a co-axial driven member, said driving member having spaced, circular plates secured thereto, a rotatable wedge supported by said plates the apex of said wedge pointing radially inwardly, means for rotating said wedge, a tongue on said wedge, means for clamping said wedge to said driving member, forked means on said clamping means cooperating with said tongue, indicating means on said clamping means, a shaft journalled on said plates, spaced arms secured to said shaft, first and second pins, a pivoting block journalled on said plates, said block having one or more bores therethrough, one or more rods having heads thereon and supported on said first pin, said rods passing through said bores and having springs thereon which bear against said heads and said block, first and second rollers on said first pin and cooperating with said rotatable wedge, a pair of links connecting said first and second pins, said second pin being journalled in said arms, a second roller on said second pin, said driven member having a curved cam secured to its periphery, said second roller cooperating with said cam to provide a positive driving connection between said driving member and said driven member.

8. An overload release coupling as set forth in claim 7, including in addition a head on said shaft for the application of a wrench, and an opening in said driving member to provide access to said head, whereby said springs, links, arms, rollers and wedge arrangement transmits a driving torque to said driven member depending on the stored energy of said springs and the angular position of said wedge, and said second roller will disengage itself from said cam when the driven torque exceeds the driving torque, and whereby said second roller can be reengaged with said cam.

9. An overload release coupling as set forth in claim 7, with the arrangement of said rods, springs thereon, links, arms, rollers and wedge resulting in a device wherein said second roller will disengage itself from said cam under overload in the normal driving direction, but will not disengage itself therefrom when said coupling is rotated in the opposite to normal direction.

References Cited in the file of this patent

UNITED STATES PATENTS

| 1,306,513 | Aurand | June 10, 1919 |

FOREIGN PATENTS

| 321,702 | Great Britain | Nov. 8, 1929 |
| 1,135,245 | France | Dec. 17, 1956 |